(12) United States Patent
Mukhopadhyay

(10) Patent No.: US 8,945,396 B2
(45) Date of Patent: Feb. 3, 2015

(54) PROCESS FOR DELAMINATION OF LAMINATED PACKAGING

(75) Inventor: Ashutosh Mukhopadhyay, Mumbai (IN)

(73) Assignee: Ashutosh Mukhopadhyay, Mumbai (IN)

( * ) Notice: Subject to any disclaimer, the term of this patent is extended or adjusted under 35 U.S.C. 154(b) by 347 days.

(21) Appl. No.: 13/516,993

(22) PCT Filed: Dec. 20, 2010

(86) PCT No.: PCT/IN2010/000825
§ 371 (c)(1),
(2), (4) Date: Jun. 18, 2012

(87) PCT Pub. No.: WO2011/077450
PCT Pub. Date: Jun. 30, 2011

(65) Prior Publication Data
US 2012/0267324 A1    Oct. 25, 2012

(30) Foreign Application Priority Data
Dec. 21, 2009 (IN) .......................... 2932/MUM/2009

(51) Int. Cl.
*C08J 11/06* (2006.01)
*C02F 9/00* (2006.01)
*B32B 43/00* (2006.01)

(52) U.S. Cl.
CPC .............. *C08J 11/06* (2013.01); *B32B 43/006* (2013.01); *B32B 2311/24* (2013.01); *B32B 2317/12* (2013.01); *B32B 2439/70* (2013.01); *B32B 2553/00* (2013.01)

USPC ............ 210/749; 210/787; 210/800; 156/703

(58) Field of Classification Search
CPC .............. C02F 1/38; C02F 1/385; C02F 1/66; C02F 9/00; C02F 2101/10; B32B 43/006; B32B 2311/24; B32B 2311/12; B32B 2553/00; B32B 2439/70; B32B 38/10
USPC .............. 210/749, 787, 800; 156/703; 521/40
See application file for complete search history.

(56) References Cited

U.S. PATENT DOCUMENTS

2004/0129372 A1    7/2004   Huang et al.

FOREIGN PATENT DOCUMENTS

| CN | 101185687 A | 6/2008 |
| DE | 4306347 A1 | 8/1994 |
| JP | 2006289224 A | 10/2006 |
| WO | 0250175 A2 | 6/2002 |
| WO | 2004031274 A1 | 4/2004 |

OTHER PUBLICATIONS

International Search Report date Jun. 1, 2011 for PCT App. No. PCT/IN2010/000825.

*Primary Examiner* — Lucas Stelling
(74) *Attorney, Agent, or Firm* — D'Ambrosio & Menon, PLLC; Usha Menon

(57) ABSTRACT

The present invention relates to a delamination method for recovering constituents of a paper-based multi layered laminated packaged waste. The method comprises using of a mixture of inorganic bases to separate the constituents of the packaged waste and recover paper, plastic and/or aluminium components separately. The paper can be recovered as pulp, the plastic can be recovered as is, and the aluminium can be recovered as a water soluble salt. The delamination method of the present invention is also effective on cardboard-based multi layered laminated packaged waste.

9 Claims, No Drawings

PROCESS FOR DELAMINATION OF LAMINATED PACKAGING

PRIORITY CLAIM

This application is a U.S. National stage entry under 35 U.S.C. 371 of PCT/IN2010/000825 filed Dec. 20, 2010 and designating the United States which claims the benefit of earlier filing date and right to priority to Indian Application No.: 2932/MUM/2009 filed Dec. 21, 2009, the disclosure(s) of which is (are) expressly incorporated by reference herein.

FIELD OF INVENTION

The present invention relates to recovery of constituents of multi layered laminated packaging waste. More specifically, it relates to the use of a mixture of inorganic bases to recover the constituents of a paper-based multi layered laminated fragments of packaging industrial waste.

BACKGROUND OF THE INVENTION

Paper-based laminated packaging has been the most conventional and widely practiced method to keep contents in such packaging fresh and less prone to external damage. Such packaging is generally done in a multi layered form to impart strength and durability to the final package. The lamination is introduced into paper in the form of either Aluminum or Low-density polyethylene (LDPE), or LDPE and Plastics of different family such as Polyester or Bi-Axially Oriented Polypropylene (BOPP) or Cast Polypropylene (CPP). Paper-based multi layered packages today enjoy tremendous popularity to pack FMCG products, food and beverages. One of the outcomes of using such packages, and the one which is generally left ignored, is the amount of waste that is generated once the package is opened and the content therein consumed. The empty/used packages, being non recyclable, due to the lamination, add to the bulk of community waste and lie neglected at dumping grounds thus causing an irreversible damage to the Earth and Environment.

Methods to fight this menace and recover the laminated component have relied mostly on recovering the paper component of the laminated packaging waste.

Recovery of paper is essential since for most of the packages paper form the largest (about 90-95%) bulk of the entire package weight. Any technique to recover the paper component would render the entire process not only highly profitable but would be environment friendly as well. The major concern with recovering paper, however, is the difficulty in saving it in any form and frame because of its delicate physique and sensitivity to any chemical, including water.

U.S. Pat. No. 4,188,259 teaches a method for recovering cellulosic fibres from thermoplastic-fibreboard laminates. The said method relies on an alternate high-low temperature and pressure treatment to separate the thermoplastic fragments from the cellulosic fibres. The method is restrictive in the manner that it only recovers the cellulosic fibre and not the thermoplastic fragments.

U.S. Pat. No. 4,168,199 discloses a method for recovering cellulosic fibres from laminated material having a cellulosic fibre layer and a metallic foil layer by a varying pressure treatment. The method also recovers the metal foil component.

Pyrolysis or chemical decomposition of condensed organic substances by heating has also been attempted as a delamination method. Ahmet Korkmaz et al in Waste Management (Volume 29, Issue 11, November 2009, Pages 2836-2841) discuss the use of pyrolysis to separate the constituents of a Tetra Pak package. The commercial value of such recovered constituents is, though, doubted.

Burning of the laminated package waste is also prevalent to recover the non-paper metal component and particularly the foil component. This method not only pollutes the environment but also wastes the bulk of the packaging material, i.e. paper, which is permanently lost as a result of burning.

Clearly, the prior art does not teach any method to individually separate all the constituents of a paper/cardboard-based laminated packaging waste. The methods of the prior art have been unsuccessful to recover all the constituents of a laminated package waste simultaneously and in a reusable form.

It is thus necessary to develop a method to delaminate paper-based multilayered packaging waste to recover the different constituents simultaneously. Such a method should additionally be able to recover the constituents in a manner that they are rendered useful for further processing or used/sold as such. The method should also be equally effective on cardboard based multi layered laminated packaging waste.

OBJECTS OF THE INVENTION

It is an object of the invention to provide a delamination method that delaminate paper-based multi layered laminated packaged waste.

It is an object of the invention to provide a delamination method that simultaneously recovers all the constituents used in making the laminated package.

It is an object of the invention to provide a delamination method that recovers the constituents in a form and manner that they could be processed further or used as such.

It is another object of the invention to provide a delamination method that is equally effective for a cardboard based multi layered laminated packaging waste.

It is an object of the invention to provide a delamination method that is economical as well as environment friendly.

SUMMARY OF THE INVENTION

The present invention relates to a delamination method for recovering constituents of a paper-based multi layered laminated packaged waste. The method comprises using of a mixture of inorganic bases to separate the constituents of the packaged waste and recover paper, plastic and/or aluminium components separately. The paper can be recovered as pulp, the plastic can be recovered as is, and the aluminium can be recovered as a water soluble salt. The delamination method of the present invention is also effective on cardboard-based multi layered laminated packaged waste.

DETAILED DESCRIPTION OF THE INVENTION

According to the invention, paper-based multilayer laminated packaging waste laminated with plastic and thin foils of aluminium, either on one side or on both the sides is treated with a mixture of inorganic bases to recover the constituents. The method of the present invention simultaneously recovers all the constituents present in such paper-based laminated packaging waste, such as paper, plastic and aluminium and in a form where the individual constituents could be commercially reused. In an embodiment, the paper-based multi layered package waste also comprises card board (or paperboard or tetra-pack) based laminated packaging waste. The paper-based multilayer laminated packaging can include plastics such as PET, LDPE, BOPP, CPP, and Polyester.

The paper-based multilayer laminated packaging waste is typically in the form of sheets or strips or tubes. In an embodiment, prior to the delamination method, un-shredded forms of the laminated packaging waste, through conventional shredder, can be shredded breadthwisely at an average 0.25 cm-1 cm, irrespective of length, but preferably not more than one metre. In another embodiment, the laminated packaging waste, in the form of sheets and/or tubes can also be directly delaminated using the delamination method.

In an embodiment, the comminuted waste fragments can be dipped in a mixture of inorganic bases, specifically, a proportioned mixture of sodium sulfite, sodium sulfate and sodium hydroxide for a paper-based waste. In another embodiment, a proportioned mixture of sodium sulfite, potassium sulfite, sodium sulfate, and sodium hydroxide can be used, at an ambient temperature condition, for delamination constituents of a cardboard-based laminated packaging waste. In an embodiment, for the paper-based waste, the inorganic bases—sodium sulfite, sodium sulfate and sodium hydroxide—can be mixed in a proportion 3:3:1 (w/w). In yet another embodiment, for the cardboard-based waste, the inorganic bases—sodium sulfite, potassium sulfite, sodium sulfate and sodium hydroxide—can be mixed in a proportion 2:2:3:3 (w/w).

In an embodiment, the resulting reaction mix of the laminated packaging waste and the mixture of inorganic bases can be stirred briskly from time to time for about 24 to 48 hours for a paper-based waste, and for about 24 to 96 hours for a cardboard-based waste, till the de-lamination is complete. The mixture of inorganic bases neither dissolves the plastics nor the paper component but dissolves the aluminium and the binder adhesive from lamination thereby dissolving the chemical bondage of lamination. In an embodiment, the mixture of inorganic bases dissolves all classes of adhesives used for bonding the lamination.

In an embodiment, once the adhesive is dissolved, the paper component gets detached from the waste and settles at the bottom of the container in which the reaction has been carried out. The plastic component, on the other hand, floats as a separate layer on the surface of the reaction mixture solution. This layer is extracted from the solution by simple decantation. In an embodiment, the separated plastic layer can be further dipped in either dilute nitric acid or dilute solution of sodium hydroxide to clear out the stuck paper layer and after a water wash and subsequent drying the clear fragments of plastics can be recovered. This step can be repeated, if necessary. After recovery of the plastic, the mass of paper that has settled at the bottom of the container can be separated out by simple filtration of the solution. The collected mass of paper can be centrifuged to remove the excess liquid and can be subsequently dried. In yet another embodiment, the centrifugation and drying can be repeated to get a dry mass of paper pulp. The pulp so obtained retains the properties of the paper apart from the obvious change in properties due to soaking and wetting in the presence of water.

In another embodiment, the aluminium component of the laminated packaging waste, if present, gets dissolved in the reaction mixture solution as water soluble sodium aluminates. These aluminates gradually concentrate and at one time, subject to the mass of the aluminium, get deposited on the bottom of the solution as water insoluble aluminium hydroxide gel. In an embodiment, aluminium hydroxide gel can be subsequently separated from the solution by simple filtration.

Subsequent to the separation of the constituents, the metal radical of sodium/potassium salt can be recycled with addition of dilute hydrochloric acid to form a sodium chloride (common salt) and potassium chloride which could be marketed as such.

EXAMPLES

The present invention is further explained in the form of following examples. However, these examples should not be construed as limiting the scope of the invention in any manner.

Example 1

For Laminated Packaging Refuse Laminated With Paper and LDPE/BOPP/CPP/Polyester Plastics In a 1000 ml beaker, 500 ml clear water is taken. Over that water dried powder/flakes of (i) 15 gm of sodium sulfite, (ii) 15 gm of sodium sulfate and (iii) 5 gm of sodium hydroxide are added. The resultant solution is stirred well to make a clear solution. Next, 10/25 gms or a few small pieces of previously cut pieces (1.5 cm by 3 cm) of packaging lamination waste, like those used in common packaging of outer soap wrappers {not boxes} and inner stiffeners, are taken and dipped into the beaker. The reaction mix is then allowed to stand for 24 to 48 hours with brisk stirring, subject to the adhesive/lamination and thickness of the paper.

80-95% of the paper being wet with the solution gets detached from fragment and settles at the bottom. Stirring plays a big role to detach the paper by moving water force as a friction. The free plastic, along with a primary layer of the paper that get stuck with it, float over the solution. The free plastic layer is recovered from the solution by simple decantation or as collection from the surface of the solution. Further dips in either dilute nitric acid or dilute solution of sodium hydroxide, subject to choice, clears out the stuck paper-layer and after a good wash and subsequent drying, the clear fragments of plastics is recovered.

After removing the plastic component from the solution, the mass of the paper is removed by filtration of the solution. The collected mass is centrifuged to remove excess liquid and after a subsequent drying the paper component is obtained as pulp.

The metal radical of sodium salt present in the solution is neutralized with addition of dilute hydrochloric acid. Sodium Chloride thus formed could be marketed as common salt.

Example—2

Laminated Packaging Refuse Laminated With Paper and LDPE/BOPP/CPP/Polyester Plastics and Thinner Foils of Metal Aluminium/Metalized Aluminium In a 1000 ml beaker 500 ml clear water is taken. Over that water dried powder/flakes of (i) 15 gm of sodium sulfite, (ii) 15 gm of sodium sulfate and (iii) 5 gm of sodium hydroxide are added. The resultant solution is stirred well to make a clear solution. Next, 10/25 gms or a few small pieces of previously cut pieces (1.5 cm by 3 cm) of packaging lamination waste, like those used in common food packaging {not boxes} laminated with paper, plastics and aluminium, are taken and dipped into the beaker. The reaction mix is then allowed to stand for 24 to 48 hours with brisk stirring, subject to the adhesive/lamination and thickness of the paper/aluminium.

The aluminium component gets dissolved in the solution. 80-95% of the paper being wet with the solution gets detached from fragment and settles at the bottom. Stirring plays a big role to detach the paper by moving water force as a friction. The free plastic, along with a primary layer of the paper that get stuck with it, float over the solution.

The free plastic layer is recovered from the solution by simple decantation or as collection from the surface of the solution. Further dips in either dilute nitric acid or dilute solution of sodium hydroxide, subject to choice, clears out the stuck paper-layer and after a good wash and subsequent drying, the clear fragments of plastics is recovered.

The aluminium component, if present, gets dissolved in the reaction mixture solution as soluble sodium aluminates. These aluminates gradually concentrate and at one time, subject to the mass of the aluminium, get deposited on the bottom of the solution as insoluble Aluminium hydroxide gel which is subsequently separated from the solution by simple filtration.

After removing the plastic component from the solution, the mass of the paper is removed by filtration of the solution. The collected mass is centrifuged to remove excess liquid and after a subsequent drying the paper component is obtained as pulp.

The metal radical of sodium salt present in the solution is neutralized with addition of dilute hydrochloric acid. Sodium Chloride thus formed could be marketed as common salt.

Example—3

Laminated Packaging Refuse Laminated With Board and LDPE/BOPP/CPP/Polyester Plastics In a 1000 ml beaker 500 ml clear water is taken. Over that water dried powder/flakes of (i) 10 gm of sodium sulfite, (ii) 10 gm of potassium sulfite, (iii) 15 gm of sodium sulfate and (iv) 15 gm of sodium hydroxide are added. The resultant solution is stirred well to make a clear solution. Next, 10/25 gms or a few small pieces of previously cut pieces (1.5 cm by 3 cm) of packaging lamination waste, like those used in common packaging of outer soap wrappers as boxes or other simple boxes, laminated with board and plastic material, are taken and dipped into the beaker. The reaction mix is then allowed to stand for 24 to 96 hours with brisk stirring, subject to the adhesive/lamination and thickness of the board.

80-95% of the board being wet with the solution gets detached from fragment and settles at the bottom. Stirring plays a big role to detach the board by moving water force as a friction. The free plastic, along with a primary layer of the board that get stuck with it, float over the solution.

The free plastic layer is recovered from the solution by simple decantation or as collection from the surface of the solution. Further dips in either dilute nitric acid or dilute solution of sodium hydroxide, subject to choice, clears out the stuck board-layer and after a good wash and subsequent drying, the clear fragments of plastics is recovered. After removing the plastic component from the solution, the mass of the board is removed by filtration of the solution. The collected mass is centrifuged to remove excess liquid and after a subsequent drying the board component is obtained as pulp.

The metal radical of sodium/potassium salt present in the solution is neutralized with addition of dilute hydrochloric acid. Sodium Chloride (common salt) and Potassium Chloride thus formed could be marketed as such.

Example—4

Laminated Packaging Refuse Laminated With Board and LDPE/BOPP/CPP/Polyester Plastics and Thinner Foils of Metal Aluminium/Metalized Aluminium.

In a 1000 ml beaker 500 ml clear water is taken. Over that water dried powder/flakes of (i) 10 gm of sodium sulfite, (ii) 10 gm of potassium sulfite, (ii) 15gm of sodium sulfate and (iv) 15 gm of sodium hydroxide are added. The resultant solution is stirred well to make a clear solution. Next, 10/25 gms or a few small pieces of previously cut pieces (1.5 cm by 3 cm) of packaging lamination waste, like those used in common packaging of outer wrappers as boxes or other simple boxes or other packaging that are laminated with board, plastics and/or aluminium, are taken and dipped into the beaker. The reaction mix is then allowed to stand for 24 to 96 hours with brisk stirring, subject to the adhesive/lamination and thickness of the board/aluminium.

The aluminium component gets dissolved in the solution. 80-95% of the board being wet with the solution gets detached from fragment and settles at the bottom. Stirring plays a big role to detach the board by moving water force as a friction. The free plastic, along with a primary layer of the board that get stuck with it, float over the solution. The free plastic layer is recovered from the solution by simple decantation or as collection from the surface of the solution. Further dips in either dilute nitric acid or dilute solution of sodium hydroxide, subject to choice, clears out the stuck board-layer and after a good wash and subsequent drying, the clear fragments of plastics is recovered.

The aluminium component, if present, gets dissolved in the reaction mixture solution as water soluble sodium aluminates. These aluminates gradually concentrate and at one time, subject to the mass of the aluminium, get deposited on the bottom of the solution as insoluble Aluminium hydroxide gel which is subsequently separated from the solution by simple filtration.

After removing the plastic component from the solution, the mass of the board is removed by filtration of the solution. The collected mass is centrifuged to remove excess liquid and after a subsequent drying the board component is obtained as pulp. The metal radical of sodium/potassium salt present in the solution is neutralized with addition of dilute hydrochloric acid. Sodium Chloride (common salt) and Potassium Chloride thus formed could be marketed as such.

Example—5

Laminated Packaging Refuse Laminated With Paper, Board and LDPE/BOPP/CPP/Polyester Plastics and Thinner Foils of Metal Aluminium/Metalized Aluminium Known in Particular as Tetra-Pack In a 1000 ml beaker 500 ml clear water is taken. Over that water dried powder/flakes of (i) 10 gm of sodium sulfite, (ii) 10 gm of potassium sulfite, (ii) 15 gm of sodium sulfate and (iv) 15 gm of sodium hydroxide are added. The resultant solution is stirred well to make a clear solution. Next, 10/25 gms or a few small pieces of previously cut pieces (1.5 cm by 3 cm) of packaging lamination waste, like those used in common packaging of edible liquid as boxes (commercially sold by Tetra Pak) that are laminated with paper, board, plastics and/or aluminium, are taken and dipped into the beaker. The reaction mix is then allowed to stand for 24 to 96 hours with brisk stirring, subject to the adhesive/lamination and thickness of both the board and aluminium.

The aluminium component gets dissolved in the solution. 80-95% of the board being wet with the solution gets detached from fragment and settles at the bottom. Stirring plays a big role to detach the board by moving water force as a friction. The free plastic, along with a primary layer of the paper/board mix that get stuck with it, float over the solution.

The free plastic layer is recovered from the solution by simple decantation or as collection from the surface of the solution. Further dips in either dilute nitric acid or dilute solution of sodium hydroxide, subject to choice, clears out the stuck board-layer and after a good wash and subsequent drying, the clear fragments of plastics is recovered.

The aluminium component, if present, gets dissolved in the reaction mixture solution as water soluble sodium aluminates. These aluminates gradually concentrate and at one time, subject to the mass of the aluminium, get deposited on the bottom of the solution as insoluble Aluminium hydroxide gel which is subsequently separated from the solution by simple filtration.

After removing the plastic component from the solution, the mass of the mixed paper and board is removed by filtration of the solution. The collected mixed mass is centrifuged to remove excess liquid and after a subsequent drying the board component is obtained as pulp. The metal radical of sodium/potassium salt present in the solution is neutralized with addition of dilute hydrochloric acid. Sodium Chloride (common salt) and Potassium Chloride thus formed could be marketed as such.

ADVANTAGES OF THE INVENTION

1. The present invention describes a delamination method which simultaneously recovers all the constituents of a paper-based multi layered laminated package waste.
2. The delamination method of the present invention recovers the constituents in a manner that they can be reused and commercial value be derived from their sale.
3. The delamination method of the present invention is also effective on cardboard based multi layered laminated package waste.
4. The delamination method of the present invention is environment friendly.

While the present invention may have been described through reference to specific embodiments, the invention is not limited to these specific embodiments as other embodiments and variations are within the scope of the invention.

The invention claimed is:

1. A process for recovery of constituents of multi-layered laminated packaging waste, said process comprising the steps of:
    treating said multi-layered laminated packaging waste with a mixture of inorganic bases proportioned to dissolve bonding between said constituents; and
    separating said constituents from each other,
        wherein the mixture of inorganic bases comprises sodium sulfite, sodium sulfate and sodium hydroxide.
2. The process as claimed in claim 1, wherein said constituents further comprise of one or more of Plastic and Aluminium.
3. The process as claimed in claim 1, wherein said multi-layered laminated packaging waste is a paper-based multi-layer laminated packaging waste and said constituents comprise a paper constituent.
4. The process as claimed in claim 1, wherein said multi-layered laminated packaging waste is a cardboard-based or paper/cardboard mix-based multi-layered laminated packaging waste.
5. The process as claimed in claim 1, wherein ratio of said sodium sulfite, said sodium sulfate, and said sodium hydroxide in said mixture is 3:3:1.
6. The process as claimed in claim 1, wherein said mixture of inorganic bases further comprises potassium sulfite.
7. The process as claimed in claim 6, wherein ratio of said sodium sulfite, said potassium sulfite, said sodium sulfate, and said sodium hydroxide in the mixture is 2:2:3:3.
8. The process as claimed in claim 3, wherein
    said paper constituent of said multi-layered laminated packaging waste is reduced to pulp and collected from the bottom of a treatment container;
    a plastic constituent floats on surface of said treatment container; and
    an aluminium constituent dissolves in said mixture of inorganic bases as soluble sodium aluminates.
9. The process as claimed in claim 8, wherein said separating further comprises:
    centrifuging said pulp and drying said centrifuged mass of said pulp,
    decanting said plastic constituent from treatment container and dipping said plastic constituent in dilute nitric acid or dilute solution of sodium hydroxide; and
    separating an insoluble aluminium hydroxide gel formed from said soluble sodium aluminates by filtration.

* * * * *